(12) United States Patent
Petty

(10) Patent No.: US 6,233,933 B1
(45) Date of Patent: May 22, 2001

(54) ARRANGEMENT AND METHOD FOR REMOVAL OF AIR FROM A HYDRAULIC SYSTEM

(75) Inventor: Jon A. Petty, Tucson, AZ (US)

(73) Assignee: Phoenix Systems, L.L.C., Tucson, AZ (US)

( * ) Notice: Subject to any disclaimer, the term of this patent is extended or adjusted under 35 U.S.C. 154(b) by 0 days.

(21) Appl. No.: 09/223,338

(22) Filed: Dec. 30, 1998

Related U.S. Application Data (63) Continuation-in-part of application No. 09/162,962, filed on Sep. 29, 1998, which is a continuation of application No. 08/738,776, filed on Oct. 29, 1996, now Pat. No. 5,813,225.

(51) Int. Cl.⁷ .................................................. B60T 11/30
(52) U.S. Cl. .................................................. 60/584; 60/327
(58) Field of Search ........................... 60/584, 453, 413, 60/415; 239/526, 586, 71; 141/98; 222/71, 74, 75; 188/352

(56) References Cited

U.S. PATENT DOCUMENTS

| | | | |
|---|---|---|---|
| 1,611,434 | * 12/1926 | Graham | 60/584 |
| 2,505,213 | 4/1950 | Schnell | 60/52 |
| 2,635,620 | 4/1953 | Deardorff | 137/197 |
| 3,154,087 | 10/1964 | Beaver | 60/453 |
| 3,157,478 | 11/1964 | Edwards | 55/36 |
| 3,561,214 | 2/1971 | Bobst | 60/53 |
| 4,017,329 | * 4/1977 | Larson | 188/352 |
| 4,038,823 | 8/1977 | Mostert | 60/584 |
| 4,201,056 | * 5/1980 | De Martelaere et al. | 60/584 |
| 4,741,417 | 5/1988 | Caramanna | 188/352 |
| 4,785,629 | * 11/1988 | Ennis, III et al. | 60/584 |
| 4,804,023 | * 2/1989 | Frearson | 188/352 |
| 4,842,107 | * 6/1989 | Buchannan et al. | 60/584 |
| 5,456,078 | 10/1995 | Goloff | 60/327 |
| 5,653,316 | * 8/1997 | Kane | 60/584 |

* cited by examiner

Primary Examiner—Edward K. Look
(74) Attorney, Agent, or Firm—Antonio R. Durando (57) ABSTRACT

An arrangement for feeding hydraulic fluid to a hydraulic system includes a nozzle equipped with a metering valve. The nozzle is connected to a pressure bleeder containing hydraulic fluid.

25 Claims, 7 Drawing Sheets

ARRANGEMENT AND METHOD FOR REMOVAL OF AIR FROM A HYDRAULIC SYSTEM

REFERENCE TO RELATED APPLICATIONS

This application is a continuation-in-part of application Ser. No. 09/162,962, entitled "Arrangement and Method for Removal of Air from a Hydraulic System," filed on Sep. 29, 1998, which in turn is a continuation application of Ser. No. 08/738,776, entitled "Arrangement and Method for Removal of Air from a Hydraulic System," filed on Oct. 29, 1996, issued as U.S. Pat. No. 5,813,225.

BACKGROUND OF THE INVENTION

1. Field of the Invention

The invention relates to the removal of contaminants from a hydraulic system.

2. Description of the Prior Art

The braking system of a motor vehicle is generally bled by opening the bleed valve for each brake individually and pumping the brakes. This procedure not only requires two people but is also very time-consuming.

These drawbacks are overcome by U.S. Pat. No. 4,038,823 in which a reciprocating pump is used to pump brake fluid into the servo cylinders of the braking system. Bleeding of a brake is complete when clear brake fluid enters the reservoir of the master cylinder. In order for the person bleeding the brakes to ascertain that clear brake fluid is entering the reservoir, a long feed line must be provided from the pump to the brake being bled. This is cumbersome.

U.S. Pat. No. 4,741,417 employs a motor-driven rotary pump for bleeding a braking system. The pump inlet is immersed in the reservoir of the master cylinder while the pump outlet is connected to a manifold. Flexible hoses lead from the manifold to the bleed valves of the respective servo cylinders. In operation, brake fluid is pumped from the reservoir to the servo cylinders via the manifold and the flexible hoses. The brake fluid returns to the reservoir through the brake lines of the braking system. This arrangement is complicated and, in addition, requires considerable time to set up.

U.S. Pat. No. 4,785,629 eliminates these problems by injecting brake fluid into the servo cylinders via a syringe. However, the syringe is associated with its own difficulties. To begin with, two hands are required to operate the syringe. Furthermore, the syringe cannot be very large since otherwise the force necessary to operate the syringe becomes excessive. Due to the limited size of the syringe, the syringe must be refilled frequently thereby increasing the time to bleed the braking system. In addition, the refilling operation requires disconnection of the syringe from the brake system and the attendant risk of introducing air upon reconnection. Moreover, following the injection of brake fluid with the syringe, the master cylinder must be observed to insure that all air bubbles are dissipated. Finally, as a practical matter people tend to impart too much force to the syringe at the beginning of each bleeding operation and cause rapid flow and upward splashing and/or spilling of fluid from the master cylinder.

Prior applications Ser. Nos. 08/441,107 and 08/738,776 disclose a portable pump or fluid conveying device which is simpler and quicker than the syringe. Although the pump operates very satisfactorily, it has been found that enhancements in the delivery of fluid would be desirable.

SUMMARY OF THE INVENTION

It is an object of the invention to improve the supply of fluid to hydraulic systems.

The preceding object, as well as other which will become apparent as the description proceeds, are achieved by the invention.

One aspect of the invention resides in a kit for delivering fluid to a hydraulic system. The kit comprises a first conduit, a second conduit, and a portable fluid conveying device for introducing fluid into the hydraulic system. The device is connectible to the conduits and includes means for metering fluid.

With a pump or syringe, control over the rate of discharge is difficult to achieve. In contrast, the metering means of the fluid conveying device of the invention makes it possible to regulate the flow of fluid relatively simply.

Another aspect of the invention resides in an arrangement for delivering fluid to hydraulic systems. The arrangement comprises a fluid conveying device for introducing fluid into hydraulic systems, and a pressure bleeder containing hydraulic fluid.

When using a syringe or hand pump, the energy for feeding fluid to a hydraulic system is supplied manually which is tiring. With a power pump, on the other hand, it is difficult to regulate the flow of fluid. The pressure bleeder in the arrangement of the invention enables the manual effort for operating a syringe or hand pump to be reduced inasmuch as the bleeder is a source of energy. At the same time, the pressure bleeder allows the flow of fluid to be controlled in a relatively simple fashion.

An additional aspect of the invention resides in a method of delivering fluid to a hydraulic system. The method comprises the step of feeding hydraulic fluid from a pressure bleeder to the system.

The hydraulic system may have a servo member with an opening and/or a master member with an opening. The hydraulic fluid from the pressure bleeder can then be fed into the hydraulic system through the opening in the servo member or through the opening in the master member. In the latter case, the method can further comprise the steps of providing an adapter designed to fit into openings of different size, and inserting the adapter in the opening of the master member prior to feeding hydraulic fluid into the hydraulic system. The hydraulic fluid is here fed into the hydraulic system via the adapter. The adapter may have a frustoconical end portion and such end portion may be inserted in the opening of the master member.

The can also comprise the step of metering the hydraulic fluid which issues from the pressure bleeder. The metering step may involve regulating the amount of hydraulic fluid which is fed into the hydraulic system in substantial proportion to displacement of a metering element.

Additional features and advantages of the invention will be forthcoming from the following detailed description of preferred embodiments when read in conjunction with the accompanying drawings.

DESCRIPTION OF THE PREFERRED EMBODIMENTS

Figure 1:
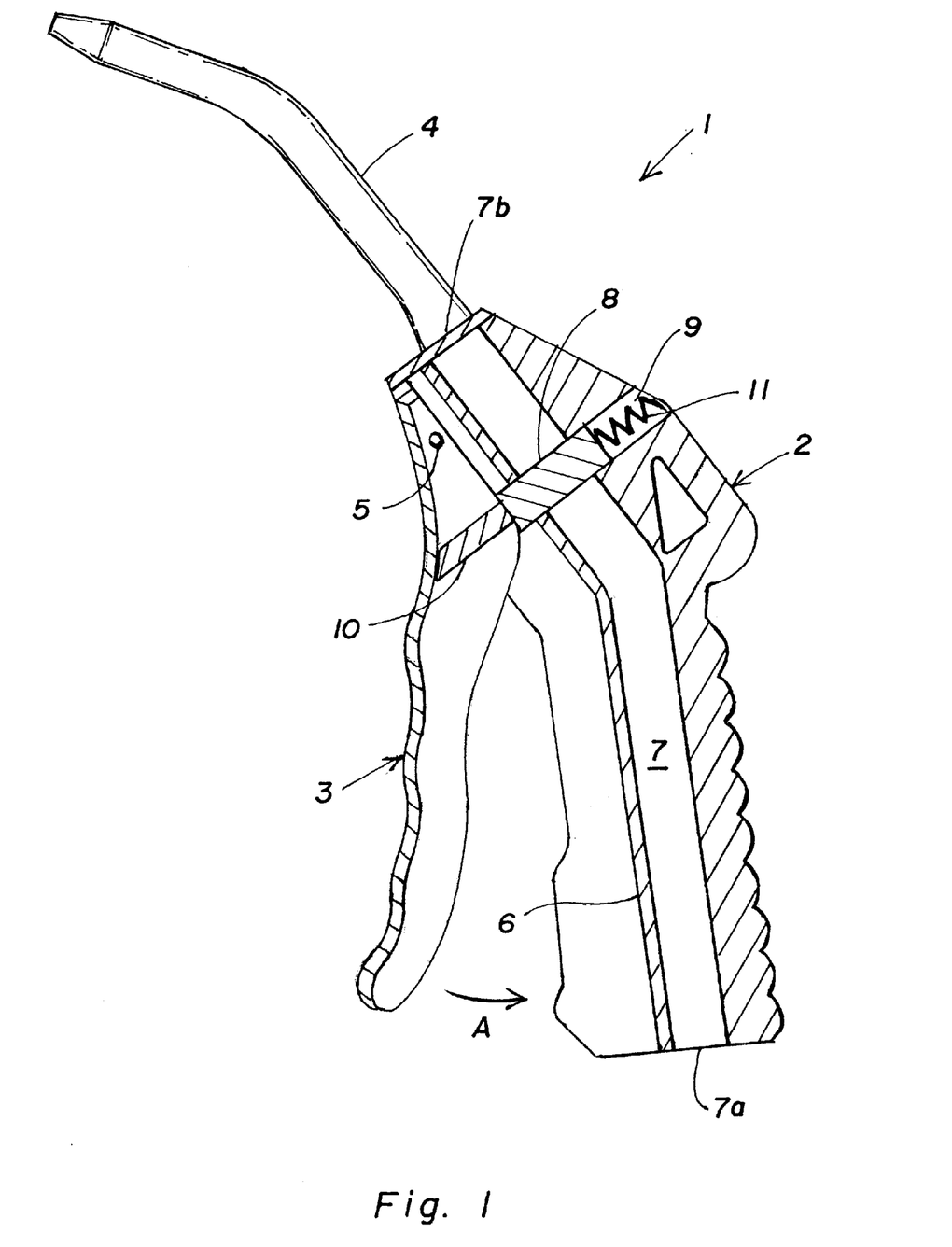
FIG. 1 is a partly sectional side view of one embodiment of a nozzle for introducing fluid into a hydraulic system according to the invention.

Referring to FIG. 1, the numeral 1 identifies a nozzle or fluid conveying device for introducing fluid into hydraulic systems. The nozzle 1 is designed to be hand-held and to be carried around in the hand or on the person of a user. The nozzle 1 comprises a casing 2, a trigger or trigger-like operating member 3, and an elongated spout or spout-like member 4. The trigger 3 is pivotally connected to the casing 2 by a pivot pin 5 and is rotatable in the direction of the arrow A from the inoperative position illustrated in FIG. 1 to operative positions.

A conduit or pipe 6 extends through the casing 2 and defines a flow passage 7 having an inlet end 7a and an outlet end 7b. The outlet end 7b opens to the spout 4.

The flow of fluid through the flow passage 7 is regulated by a metering valve which includes a cylindrical valve element or metering element 8 extending transverse to the flow passage 7. The valve element 8 is slidably mounted in a guide passage 9. One end of the valve element 8 protrudes from the guide passage 9, and the trigger 3 is provided with a rib 10 which faces and abuts the protruding end of the valve element 8. Thus, the valve element 8 is displaced in response to movement of the trigger 3 which serves as an operating member to shift the valve element 8 transversely of the flow passage 7.

In the inoperative position of the trigger 3, the valve element 8 is in an inoperative or closed position and completely blocks the flow passage 7. As the trigger 3 is moved out of its inoperative position, the trigger 3 urges the valve element 8 from the inoperative position of the valve element 8 to operative or open positions in which the flow passage 7 is at least partially unblocked. The valve element 8 is designed in such a manner that, when pressurized fluid is admitted into the inlet end 7a of the flow passage 7, the rate of fluid flow in the flow passage 7 increases with increasing displacement of the trigger 3 and valve element 8 from the respective inoperative positions. The metering valve including the valve element 8 is preferably a proportional valve so that the rate of fluid flow in the flow passage 7 increases in direct proportion to displacement of the trigger 3 and the valve element 8 from their inoperative positions.

A compression spring or biasing element 11 bears against the casing 2 and against the end of the valve element 8 remote from the trigger 3. The spring 11 continuously urges the valve element 8 and the trigger 3 to the respective inoperative positions.

The inlet end 7a of the flow passage 7 can be provided with non-illustrated threads for connecting a hose, pipe or other conduit to the nozzle 1. Alternatively, the inlet end 7a can constitute one member of a quick-disconnect coupling having a pair of cooperating coupling members.

Figure 2:
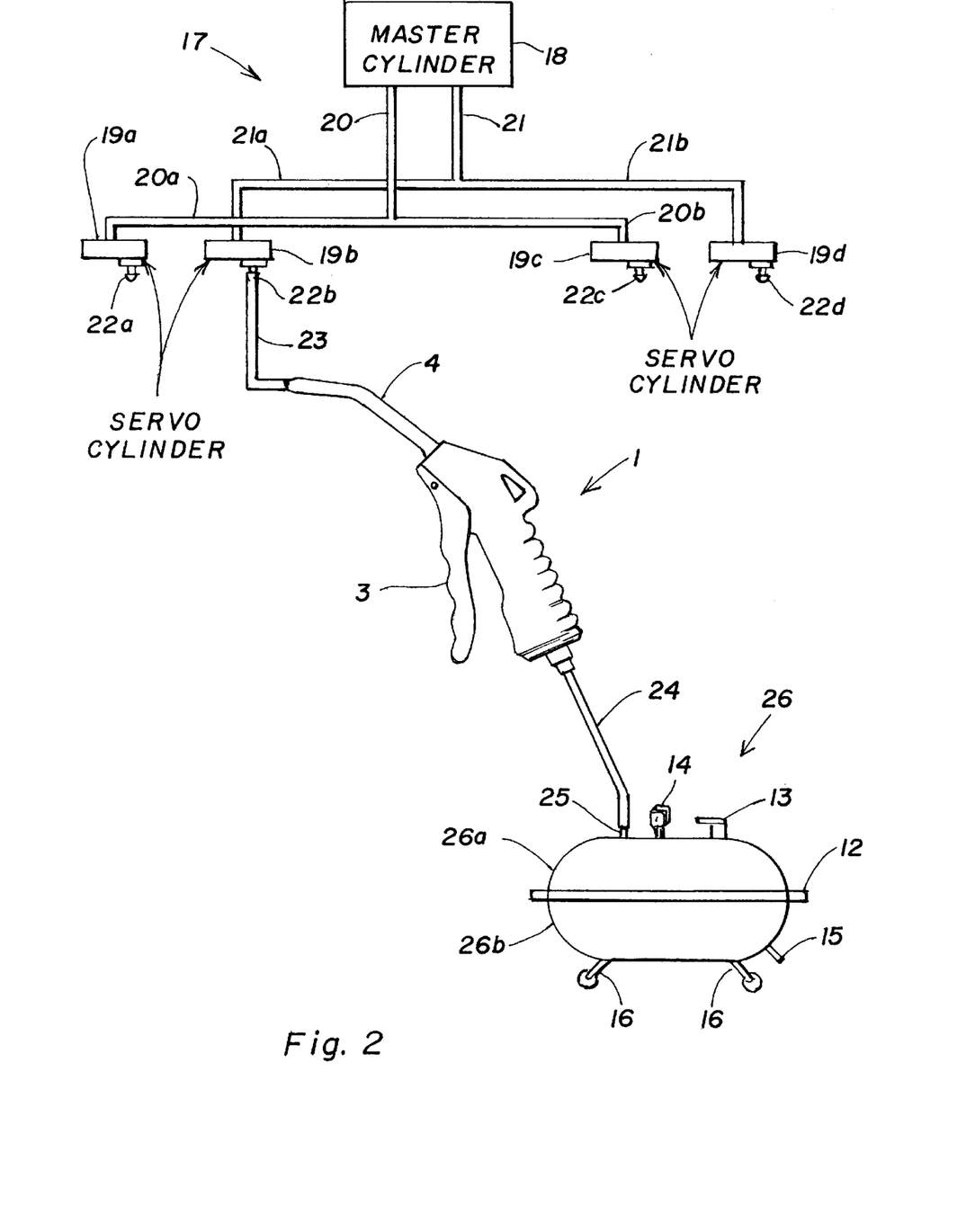
FIG. 2 schematically illustrates the nozzle of FIG. 1 during the removal of gas from a hydraulic system in accordance with the invention.

Turning to FIG. 2, the numeral 17 generally identifies a hydraulic system. The hydraulic system 17, which is here assumed to be the braking system of an automobile, includes a master cylinder or master member 18 and four servo cylinders or servo members 19a, 19b, 19c and 19d. Each of the servo cylinders 19a–19d operates a respective brake of the automobile.

The master cylinder 18 has two supply lines 20 and 21. The servo cylinders 19a and 19c are connected to the supply line 20 by way of respective branch lines 20a and 20b whereas the servo cylinders 19b and 19d are connected to the supply line 21 by way of respective branch lines 21a and 21b.

In order to purge air from the braking system 17, the servo cylinders 19a–19d are provided with bleed valves 22a, 22b, 22c and 22d, respectively. Currently, the purging of air from the braking system 17 is usually accomplished by having a first person depress the brake pedal while a second person opens the bleed valves 22a–22d one-by-one. Aside from tying up two people, this procedure is very time-consuming and it has been found more effective to feed brake fluid towards the master cylinder 18 via the bleed valves 22a–22d.

This manner of removing air from the braking system 17 is illustrated in FIG. 2 where the spout 4 of the nozzle I is connected with the bleed valve 22b of the servo cylinder 19b by a hose or section of tubing 23. A second hose or section of tubing 24 connects the inlet end 7a of the flow passage 7 in the nozzle 1 to a brake fluid outlet 25 of a pressure bleeder 26 which holds a supply of brake fluid.

The pressure bleeder 26 has an upper part 26a which defines an upper chamber and a lower part 26b which defines a lower chamber. The upper chamber accommodates the brake fluid while the lower chamber contains pressurized air, and the upper and lower chambers are separated from one another by a diaphragm 12. The brake fluid outlet 25 of the pressure bleeder 26 is mounted on the upper part 26a of the pressure bleeder 26 as are a control valve 13 and a gauge 14. A nipple 15 projects from the lower part 26b of the pressure bleeder 26.

The pressure bleeder 26 is mounted on casters, wheels or other rolling elements 16 which allow the pressure bleeder 26 to be moved from one location to another.

Normally, the reservoir for the master cylinder 18 is empty or nearly so after the brakes have been serviced. Assuming this to be the case, and assuming that all of the bleed valves 22a–22d are closed, the braking system 17 is purged of air as follows in accordance with the invention:

The bleed valve 22a is opened and is connected by the tubing 23 to the spout 4 of the nozzle 1. The inlet end 7a of the flow passage 7 in the nozzle 1 is connected by the tubing 24 to the brake fluid outlet 25 of the pressure bleeder 26. The trigger 3 of the nozzle 1 is thereupon squeezed to rotate the trigger 3 out of its inoperative position. A metered quantity of brake fluid is accordingly forced through the bleed valve 22a under the action of the pressurized air in the pressure bleeder 26. This quantity of brake fluid is equal to at least the volume of the servo cylinder 19a plus the volume of its branch line 20a. As a result, the portion of the hydraulic system 17 between the bleed valve 22a and the feed line 20 is purged of air.

Once sufficient brake fluid has been pumped through the bleed valve 22a, the trigger 3 of the nozzle 1 is released and is returned to its inoperative position by the compression spring 11. The tubing 23 is then disconnected from the bleed valve 22a and the latter is closed. The bleed valve 22b is opened and connected to the tubing 23, and the trigger 3 of the nozzle 1 is again rotated away from its inoperative position. A quantity of brake fluid equal to at least the volume of the servo cylinder 19b plus the volume of its branch line 21a is thereupon fed through the bleed valve 22b by the pressurized air in the pressure bleeder 26. Consequently, air is forced from the portion of the hydraulic system 17 between the bleed valve 22b and the feed line 21.

After the proper quantity of brake fluid has been fed through the bleed valve 22b, the trigger 3 of the nozzle 1 is allowed to return to its inoperative position and the tubing 23 is removed from the bleed valve 22b. The bleed valve 22b is closed, the bleed valve 22c opened and the tubing 23 connected to the bleed valve 22c. A quantity of brake fluid equal to at least the volume of the servo cylinder 19c plus the volume of its branch line 20b plus the volume of the feed line 20 is now forced through the bleed valve 22c. Hence, the portion of the hydraulic system 17 between the bleed valve 22c and the master cylinder 18 is cleared of air. Since air was previously removed from the portion of the hydraulic system 17 between the bleed valve 22a and the feed line 20, no air remains trapped between the master cylinder 18 and the bleed valves 22a and 22c.

When the introduction of brake fluid into the bleed valve 22c has been completed, the tubing 23 is disconnected from the bleed valve 22c which is thereafter closed. The bleed valve 22d is opened and the tubing 23 connected thereto. A quantity of brake fluid equal to at least the volume of the servo cylinder 19d plus the volume of its branch line 21b plus the volume of the feed line 21 is then forced through the bleed valve 22d. This purges the portion of the hydraulic system 17 between the bleed valve 22d and the master cylinder 18 of air. Inasmuch as air has already been forced out of the portion of the hydraulic system 17 between the bleed valve 22b and the feed line 21, air is no longer present between the master cylinder 18 and the bleed valves 22b and 22d.

After the requisite amount of brake fluid has been pumped through the bleed valve 22d, the tubing 23 is removed from the bleed valve 22d and the bleed valve 22d is closed. This finishes the operation of removing air from the braking system 17.

Thus, according to the invention, an amount of brake fluid equal to at least the volume of the servo cylinders 19a–19d plus the volume of the feed lines 20,21 plus the volume of the branch lines 20a,20b,21a,21b is fed into the braking system 17 via the servo cylinders 19a–19d. This ensures that the braking system 17 is thoroughly purged of air.

Inasmuch as the nozzle 1 can be carried by hand and the pressure bleeder 26 is rollable, a user can easily transport the nozzle 1 and the pressure bleeder 26 from one of the servo cylinders 19a–19d to the other.

The nozzle 1 and pressure bleeder 26 can be used for hydraulic systems other than braking systems, e.g., clutch systems. Furthermore, the nozzle 1 and pressure bleeder 26 can be used to purge individual components of a hydraulic system such as, for instance, a brake master cylinder, a clutch master cylinder or a clutch servo cylinder.

Among the advantages achievable with the nozzle 1 and the pressure bleeder 26 are the following:

1. The pressure bleeder 26 and the metering valve including the valve element 8 make it possible to control fluid flow in a relatively simple fashion.

2. The removal of gas from a hydraulic system can be carried out with relative ease. Thus, since the pressure bleeder 26 serves as a propellant for the hydraulic fluid to be delivered to a hydraulic system, the manual effort required to introduce the fluid into the system is reduced in comparison to a hand pump or syringe.

3. The nozzle 1 can be manufactured relatively inexpensively.

4. The removal of gas from a hydraulic system can be completed relatively quickly. On the one hand, it has been found that it is much less time-consuming to introduce hydraulic fluid into the bleed valves 22a–22d than to open the bleed valves 22a–22d and depress the brake pedal. On the other hand, the trigger 3 of the nozzle 1 and the pressure bleeder 26 allow an uninterrupted flow of hydraulic fluid to be achieved.

5. The nozzle 1 can be operated with one hand thereby leaving one hand free for other tasks.

6. The nozzle 1 does not require a complicated set-up.

7. The nozzle 1 is highly maneuverable and can be readily manipulated within the restricted spaces frequently present around hydraulic systems.

8. In a facility where air is to be removed from the hydraulic systems of a large number of cars, a mechanic can transport the nozzle 1 and the pressure bleeder 26 from car to car and work on many cars in sequence.

9. The nozzle 1 does not require refilling during normal operation thereby eliminating the risk of introducing air into the hydraulic system.

Figure 3:
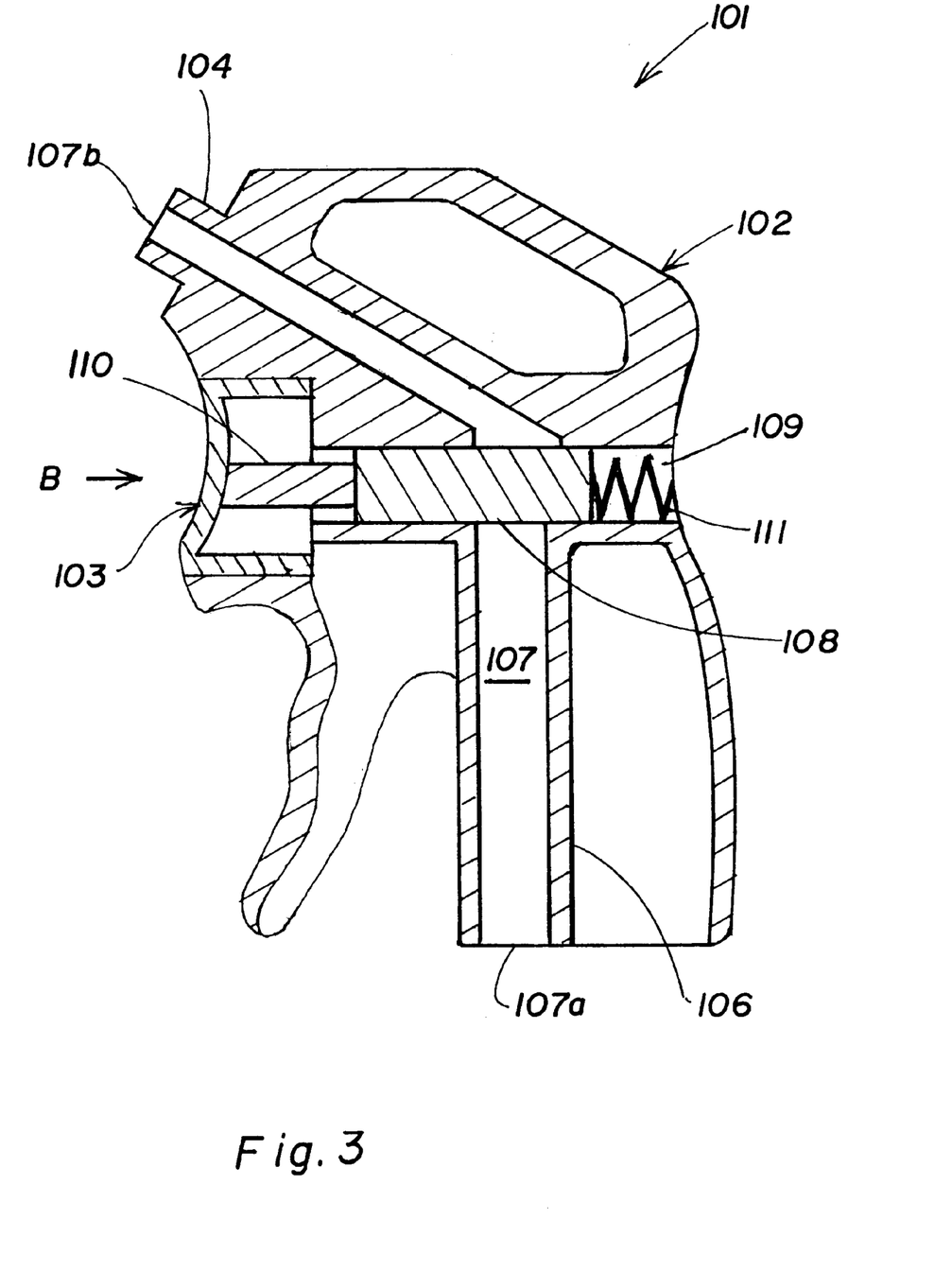
FIG. 3 is a sectional side view of another embodiment of a nozzle for introducing fluid into a hydraulic system according to the invention.

Another nozzle is illustrated in FIG. 3 where the same reference numerals as in FIG. 1, plus 100, are used to identify similar elements.

The nozzle 101 of FIG. 3 differs from the nozzle 1 of FIG. 1 in external appearance, and the nozzle 101 is also more compact than the nozzle 1 for greater maneuverability. Furthermore, the elongated spout 4 of the nozzle 1 is replaced by a short protuberance 104, and the protuberance 104 is of one piece with the casing 102 while the spout 4 is discrete from the casing 2. The protuberance 104 may be externally threaded. The nozzle 101 additionally differs from the nozzle 1 in that the trigger 103 of the nozzle 101 is slidable along a straight path rather than rotatable.

FIG. 3 shows the trigger 103 and valve element 108 of the metering valve in inoperative positions, and the trigger 103 is slidable out of its inoperative position in the direction of the arrow B. In the inoperative position of the trigger 103, the valve element 108 is in an inoperative or closed position and blocks the flow passage 107. Movement of the trigger 103 from its inoperative position in the direction of the arrow B causes the valve element 108 to be displaced to operative or open positions in which the flow passage 107 is at least partially unblocked.

Figure 4:
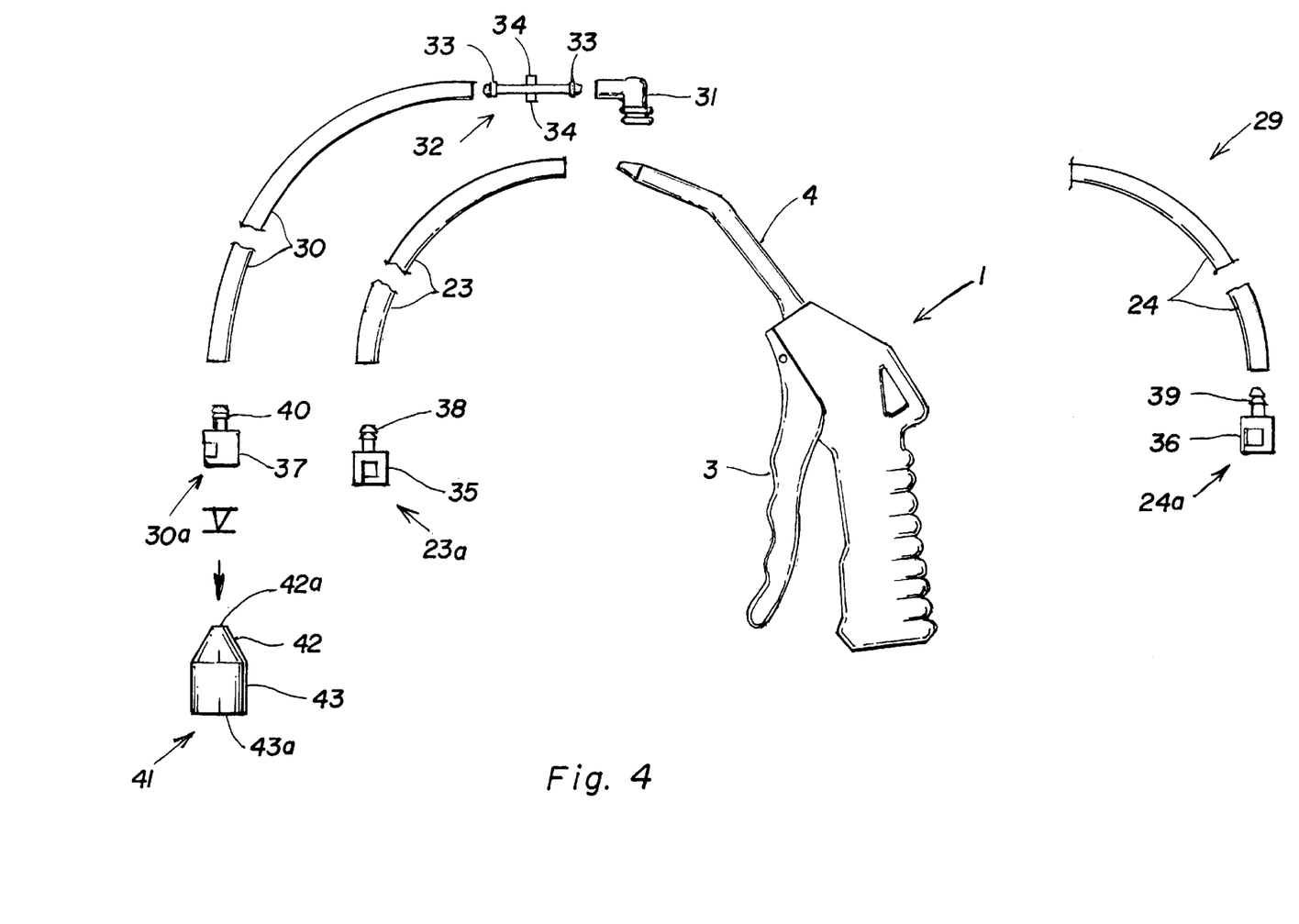
FIG. 4 shows a kit in accordance with the invention for introducing fluid into hydraulic systems.

Turning to FIG. 4, a kit or arrangement for removing contaminants from a hydraulic system is denoted by the numeral 29. The kit 29 includes the nozzle or fluid conveying device 1 for introducing fluid into a hydraulic system, and the kit 29 could additionally or alternatively include the nozzle 101. The kit 29 further includes the tubing 23 and the tubing 24. The kit 29 also includes at least one additional hose or section of tubing 30, at least one fitting 31 for coupling the tubing 30 to a bleed valve of a hydraulic system, and at least one connector 32 for connecting the fitting 31 to the tubing 30. The connector 32, which is elongated and is provided with a longitudinally extending passage, has a collar 33 at either end thereof. Stops or abutments 34 are located at the middle of the connector 32.

The kit 29 additionally includes a quick-disconnect coupling element 23a for the tubing 23, a quick-disconnect coupling element 24a for the tubing 24 and a quick-disconnect coupling element 30a for the tubing 30. The coupling element 30a is complementary to the coupling element 23a as well as the coupling element 24a, that is, the coupling element 30a can form a connection with both the coupling element 23a and the coupling element 24a. The coupling elements 23a,24a,30a have respective coupling portions 35,36,37 and respective stems 38,39,40 which are receivable in the sections of tubing 23,24,30. The coupling portion 37 of the coupling element 30a is designed to mate with the coupling portions 35,36 of the coupling elements 23a,24a.

Figure 5:
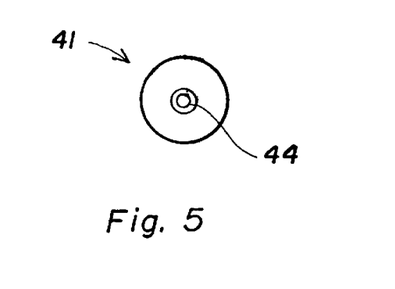
FIG. 5 is an end view of an adapter forming part of the kit of FIG. 4 as seen in the direction of the arrow V in FIG. 4.

The kit 29 also includes an adapter 41 for the pump 1. Turning to FIG. 5 in conjunction with FIG. 4, the adapter 41 has a frustoconical portion 42 and a cylindrical or annular portion 43 which is integral with the frustoconical portion 42. The frustoconical portion 42 has an exposed end face 42a while the cylindrical portion 43 has an exposed end face 43a which faces in the opposite direction from the end face 42a. A passage 44 extends longitudinally of the adapter 41 through the frustoconical portion 42 and the cylindrical portion 43. The passage 44 is designed to receive the spout 4 of the nozzle 1 with a friction fit.

If the nozzle 1 in the kit 29 were replaced by the nozzle 101, the adapter 41 would be designed to be seated on the protuberance 104 of the nozzle 101. Moreover, if the kit 29 contained both the nozzle 1 and the nozzle 101, the adapter 41 would be provided for one of the nozzles 1,101 and an additional adapter would be provided for the other of the nozzles 1,101.

Assuming that the nozzle 1 or 101 is to be used in pressure bleeding a hydraulic system through a bleed valve of a servo cylinder as shown in FIG. 2, the coupling element 23a is inserted in one end of the tubing 23 and the other end of the tubing 23 is connected to the spout 4 or protuberance 104. Similarly, the coupling element 24a is inserted in one end of the tubing 24 and the opposite end of the tubing 24 is connected to the inlet end 7a of the flow passage 7 or the inlet end 107a of the flow passage 107. Furthermore, the coupling element 30a is inserted in one end of the tubing 30 and the fitting 31 is mounted on the other end of the tubing 30 via the connector 32. The fitting 31 is placed over the bleed valve, the coupling element 23a of the tubing 23 is connected to the coupling element 30a of the tubing 30 and the coupling element 24a of the tubing 24 is connected to the brake fluid outlet 25 of the pressure bleeder 26. The nozzle 1 or 101 is then able to bleed the hydraulic system with hydraulic fluid from the pressure bleeder 26.

Hydraulic systems having a master cylinder and a reservoir for the master cylinder may sometimes need to be pressure bled through an opening in the reservoir. The adapter 41 of the kit 29 not only makes it possible for the nozzle 1 or 101 to bleed a hydraulic system in this manner but also allows the nozzle 1 or 101 to be adapted to openings of different size. Thus, the nozzle 1 or 101 can be used to bleed a series of hydraulic systems having openings of varying size.

Figure 6:
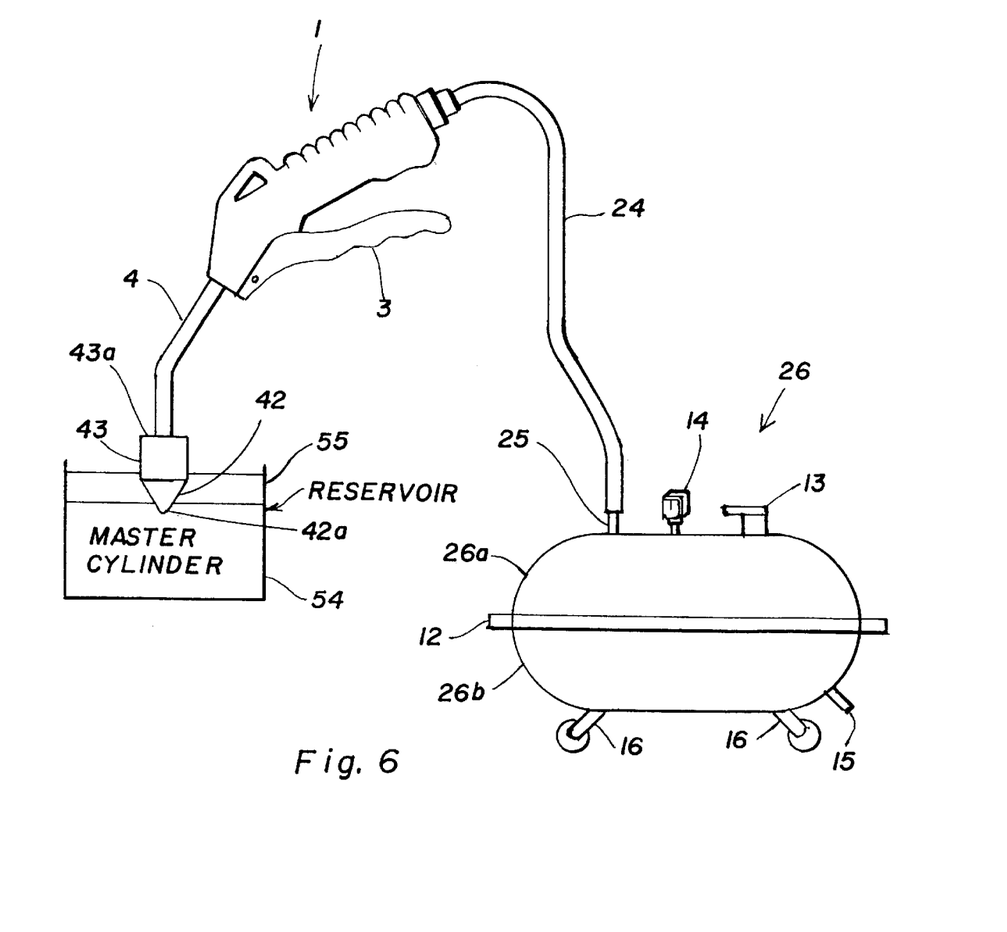
FIG. 6 illustrates the nozzle and adapter of FIG. 5 in use for the pressure bleeding of a hydraulic system according to the invention.

Considering FIG. 6 in conjunction with FIG. 4, a master cylinder of a hydraulic system is identified by the numeral 54 and a reservoir for the master cylinder by the numeral 55. The bottom of the reservoir 55 is provided with an opening which establishes communication between the reservoir 55 and the master cylinder 54.

Assuming that the hydraulic system is to be pressure bled with the nozzle 1 via the opening at the bottom of the reservoir 55, the tubing 23 is removed from the spout 4 of the nozzle 1. The adapter 41 is placed on the spout 4 so that the end face 43a of the adapter 41 faces, and the end face 42a of the adapter 41 faces away from, the nozzle 1. The nozzle 1 is positioned with the spout 4 and the adapter 41 directed downward, and the frustoconical portion 42 of the adapter 41 is inserted in the opening at the bottom of the reservoir 55. Due to the taper of the frustoconical portion 42, the frustoconical portion 42 can pass through the opening partway and thereupon make contact with the bottom wall of the reservoir 55 peripherally of the opening. This enables the frustoconical portion 42 to establish a good seal with the bottom wall. Operation of the nozzle 1 now allows the hydraulic system to be pressure bled with hydraulic fluid from the pressure bleeder 26.

The taper of the frustoconical portion 42 also permits the frustoconical portion 42 to adapt to openings of different size.

The kit 29 is not limited to the items shown in FIG. 4. For instance, the kit 29 can include one or more connectors in addition to the connector 32, and the additional connector or connectors may be of different size than the connector 32. Similarly, the kit 29 can comprise one or more fittings besides the fitting 31, and the additional fitting or fittings may be of different size than the fitting 31. The kit 29 can also include a set of instructions for the operation and maintenance of the nozzle 1 or 101.

Figure 7:
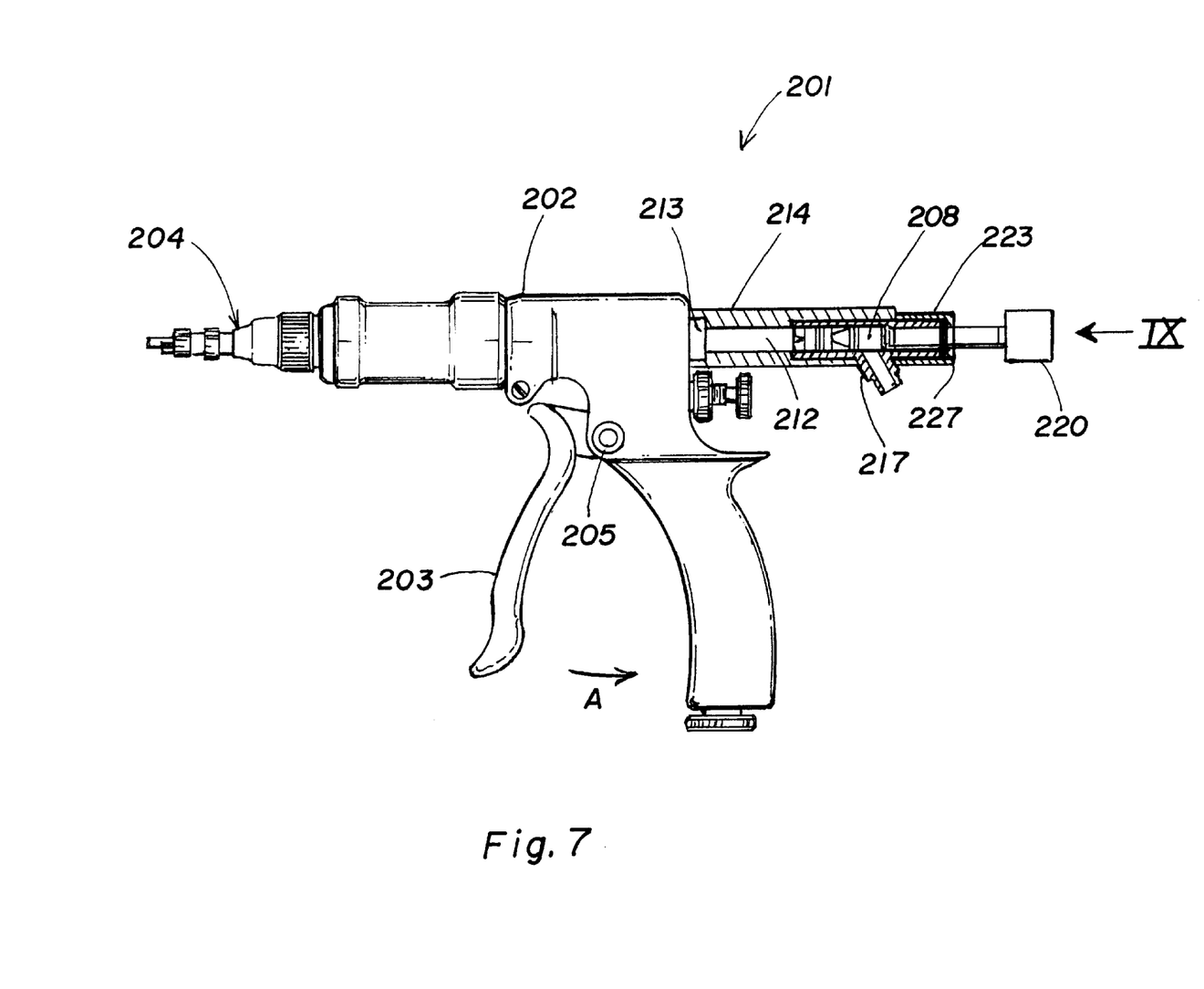
FIG. 7 is a partly sectional side view of an additional embodiment of a nozzle for introducing fluid into a hydraulic system in accordance with the invention.

An additional embodiment of a nozzle is shown in FIG. 7 where the same reference numerals as in FIG. 1, plus 200, are used to identify similar elements.

The nozzle 201 of FIG. 7 is a pump like that of prior application Ser. Nos. 08/441,107 and 08/738,776. Although the nozzle 201 and the pump of the prior applications differ in external appearance, the nozzle 201 operates in the same manner as such pump and will accordingly not be described in detail. It is sufficient here to point out that FIG. 7 shows the trigger 203 in an inoperative position and that the trigger 203 is rotatable to operative positions in the direction of the arrow A. When the trigger 203 is rotated from its inoperative position to an operative position, a preset quantity of fluid is expelled from the nozzle 201. Upon return of the trigger 203 to the inoperative position, a like quantity of fluid is drawn into the nozzle 201.

Similarly to the pump of the prior applications, the nozzle 201 includes a plunger 212. The plunger 212 is displaceable between an extended position in which the plunger 212 projects rearwardly from the casing 202 of the nozzle 201 by a larger amount and a retracted position in which the plunger 212 projects rearwardly from the casing 202 by a smaller amount. The plunger 212 moves from the extended position to the retracted position (from right to left in FIG. 7) as the trigger 203 rotates in the direction of the arrow A and from the retracted position to the extended position as the trigger 203 rotates in the opposite direction. The plunger 212 is provided with a flow passage through which fluid is drawn into the nozzle 201 during rotation of the trigger 203 counter to the direction of the arrow A. The plunger 212 extends through a guide member 213 which serves to guide the plunger 212 and is fixed to the casing 202 of the nozzle 201 externally of the casing 202. The guide member 213 is located in an elongated housing 214 mounted on the rear of the casing 202.

Figures 8, 10A:
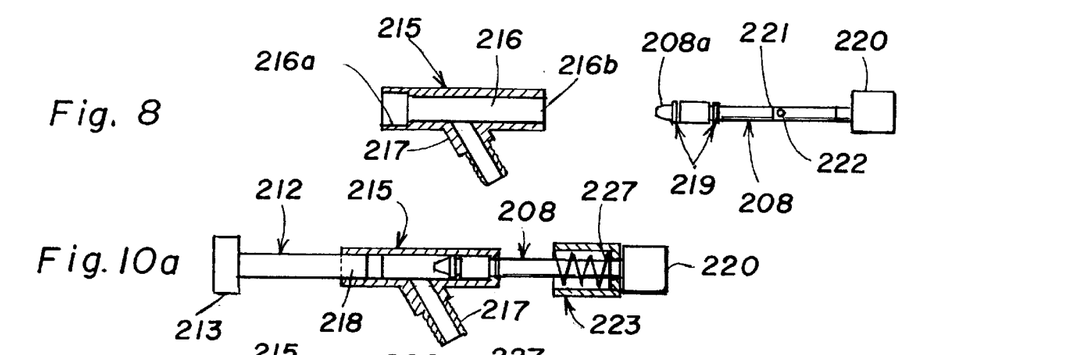
FIG. 8 is a partly sectional exploded side view of a valve body and pintle constituting part of a valve mounted on the nozzle of FIG. 7.
FIGS. 10a–10d are partly sectional side views showing different conditions of the valve on the nozzle of FIG. 7.

Referring to FIGS. 8 and 10a in conjunction with FIG. 7, the housing 214 supports a metering valve which includes a valve body 215 provided with a valve passage 216. The valve body 215 is further provided with a nipple 217 which opens to the valve passage 216 and constitutes a fluid inlet. The housing 214 is formed with a non-illustrated elongated slot which extends longitudinally of the housing 214, and the nipple 217 passes through this slot. The valve passage 216 has an open end 216a which faces the nozzle 201 and an opposite open end 216b which faces away from the nozzle 201. The valve passage 216 is enlarged at the end 216a, and the valve body 215 is internally threaded at the enlarged end 216a. On the other hand, the end 216b is provided with a small circular rim which forms a constriction at the end 216b.

The plunger 212 projects into the housing 214 and has an end portion therein which is formed with an externally threaded collar 218. The externally threaded collar 218 is received in and mates with the internally threaded end 216a of the valve passage 216 so that a connection is established between the plunger 212 and the valve body 215.

The metering valve further includes a pintle or elongated valve element 208 of circular cross section. The pintle 208 has a tapered end 208a which faces the nozzle 201 and widens in a direction away therefrom. Two annular recesses 219 for sealing elements, e.g., O-rings, are formed in the pintle 208 near the tapered end 208a. The pintle 208 has a second end which faces away from the nozzle 201, and this end of the pintle 208 is provided with a head or enlargement 220.

A bearing collar 221 is formed on the pintle 208 between the head 220 and the recess 219 nearest the head 220. Moreover, two diametrically opposed pins 222 (only one visible in the drawings) project radially from the pintle 208 on the side of the bearing collar 221 nearest the head 220.

The pintle 208 extends through a cylindrical housing 223 which sits on the pintle 208. One end of the housing 223 faces the nozzle 201 and the other end faces the head 220. The end facing the nozzle 201 is open while an end wall 224 seen in FIG. 9 extends across the opposite end. The pintle 208 passes through an opening 225 in the end wall 224, and the diameter of the opening 225 is such that the pintle 208 and the housing 223 can slide relative to one another. Two diametrically opposed slots 226 extend radially outward from the opening 225 and are sized so that the pins 222 can pass therethrough. The pins 222 and cylindrical housing 223 constitute cooperating parts of a bayonet-style lock or locking device.

Figure 9:
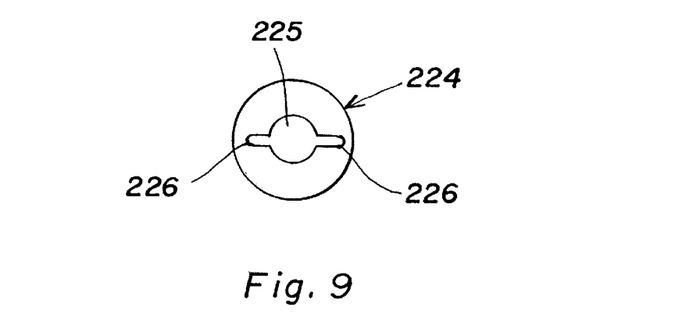
FIG. 9 is an end view, as seen in the direction of the arrow IX of FIG. 7, of a housing forming part of the valve on the nozzle of FIG. 7.

The cylindrical housing 223 accommodates a compression spring or biasing element 227. The spring 227 bears against the bearing collar 221 and against the end wall 224 of the housing 223.

The pintle 208 extends into the valve passage 216 by way of the open end 216b thereof. The portion of the pintle 208 with the tapered end 208a and the recesses 219 is received in the valve passage 216, and the tapered end 208a faces the nozzle 201. As will be explained below, the pintle 208 and valve body 215 are slidable relative to one another between a retracted position of the pintle 208 and an extended position of the pintle 208.

The operation of the metering valve on the nozzle 201 is described with reference to FIGS. 10a–10d.

Considering FIG. 10a, the pintle 208 is in an extended position. In this position, the pintle 208 is clear of the nipple 217, and the tapered end 208a lies on the side of the nipple 217 remote from the threaded end 216a of the valve passage 216. The sealing element in the recess 219 nearest the pintle head 220 sits against the constriction at the end 216b of the valve passage 216, and the constriction forms an abutment for the sealing element. The metering valve including the pintle 208 is in an unlocked or inoperative condition in which the compression spring 227 is extended and the pintle head 220 and pins 222 are located on opposite sides of the end wall 224 of the cylindrical housing 223.

With the trigger 203 of the nozzle 201 in its inoperative position and the metering valve in the unlocked condition, the plunger 212 is in its extended position and the positions of the valve body 215, the pintle 208, the cylindrical housing 223 and the spring 227 are as shown in FIG. 10a. If the trigger 203 is now rotated away from its inoperative position in the direction of the arrow A of FIG. 7, the plunger 212 retracts. Assuming that the nipple 217 is connected to a source of fluid and that the nozzle 201 has been filled with fluid in the manner described in prior applications Ser. Nos. 08/441,107 and 08/738,776, a preset quantity of fluid is expelled from the nozzle 201. The precise quantity of fluid depends upon the distance through which the trigger 203 is rotated, and the maximum quantity of fluid is expelled when the trigger 203 is rotated as far as possible in the direction of the arrow A. At the maximum displacement of the trigger 203, the valve body 215 is in abutment with the plunger guide 213.

As mentioned earlier, the plunger 212 is threaded into the valve body 215. Accordingly, when the plunger 212 retracts in response to rotation of the trigger 203 in the direction of the arrow A, the valve body 215 is drawn along with the plunger 212. The constriction at the end 216b of the valve body 215, in turn, pulls along the pintle 208, and the pintle head 220 then carries with it the cylindrical housing 223 and the spring 227.

Figure 10B:
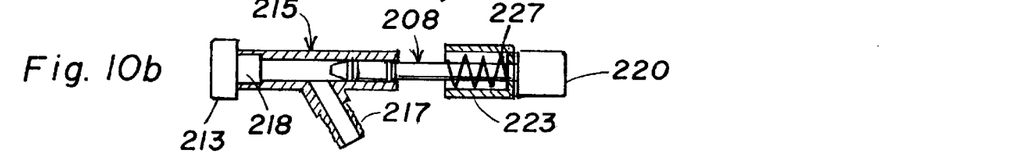

FIG. 10b illustrates the positions of the valve body 215, the pintle 208, the cylindrical housing 223 and the spring 227 when the trigger 203 has been rotated as far as possible in the direction of the arrow A. Although the valve body 215, the pintle 208, the housing 223 and the spring 227 all have shifted as can be seen from a comparison of FIGS. 10a and 10b, the relative positions are the same as in FIG. 10a. In particular, the pintle 208 remains in its extended position. Upon return of the trigger 203 to its inoperative position, the plunger 212 moves back to its extended position and the valve body 215, the pintle 208, the housing 223 and the spring 227 again assume the positions of FIG. 10a.

With the metering valve including the pintle 208 in the unlocked condition as in FIGS. 10a and 10b, the nozzle 201 operates as a pump. A quantity of fluid is expelled from the nozzle 201 when the trigger 203 is squeezed, and a like quantity of fluid enters the nozzle 201 when the trigger 203 is released. In the unlocked condition of the metering valve, the nipple 217 can be connected to a source of unpressurized fluid or to a source of pressurized fluid such as the pressure bleeder 26 of FIGS. 2 and 6.

Figure 10C:
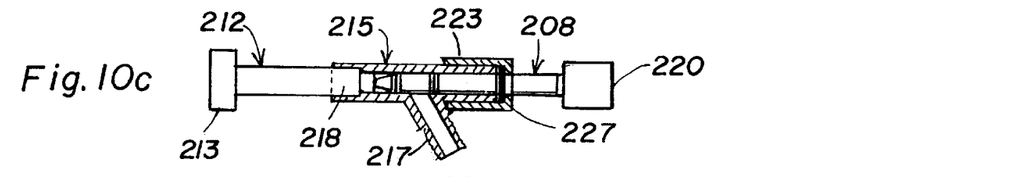

To lock the metering valve, the pintle head 220 and the cylindrical housing 223 are moved away from each other thereby compressing the spring 227 and causing the pins 222 to approach the end wall 224 of the housing 223. The pins 222 are aligned with the slots 226 in the end wall 224 and passed through the slots 226. Once the pins 222 have passed through the slots 224, the pintle 208 and the housing 223 are rotated with respect to one another in order to move the pins 222 out of alignment with the slots 224. This locks the pintle 208 to the housing 223 and places the metering valve in a locked or operative condition.

With the trigger 203 in its inoperative position and the metering valve in its locked condition, the plunger 212 is in its extended position and the positions of the valve body 215, the pintle 208, the cylindrical housing 223 and the spring 227 are as shown in FIG. 10c. The pintle 208 is now in a retracted position in which the pintle 208 extends across and blocks the nipple 217, and the tapered end 208a of the pintle 208 is located on the same side of the nipple 217 as the threaded end 216a of the valve body 215. The open end of the cylindrical housing 223 abuts the nipple 217, and the housing 223 receives the constricted end 216b of the valve body 215 as well as an adjoining portion of the valve body 215. The collar 221 on the pintle 208 lies against the constricted end 216b, and the recesses 219 with the sealing elements are spaced from the constricted end 216b.

Upon rotation of the trigger 203 out of its inoperative position in the direction of the arrow A, the plunger 212 retracts carrying the valve body 215 with it. Since the pintle 208 is locked to the cylindrical housing 223 and the constriction at the end 216b of the valve body 215 no longer acts upon the sealing element in the recess 219 nearest the pintle head 220, the pintle 208 remains stationary as the valve body 215 moves. The same holds true for the housing 223 and the spring 227. As the valve body 215 shifts, the nipple 217 moves towards the tapered end 208a of the pintle 208.

Assuming that the nipple 217 is connected to a source of pressurized fluid such as the pressure bleeder 26 of FIGS. 2 and 6, fluid begins to flow through the nipple 217 when the nipple 217 reaches the tapered end 208a of the pintle 208. The rate of fluid flow increases as the nipple 217 moves across the tapered end 208a reaching a maximum when the nipple 217 clears the tapered end 208a at the maximum displacement of the trigger 203 in the direction of the arrow A.

Figure 10D:
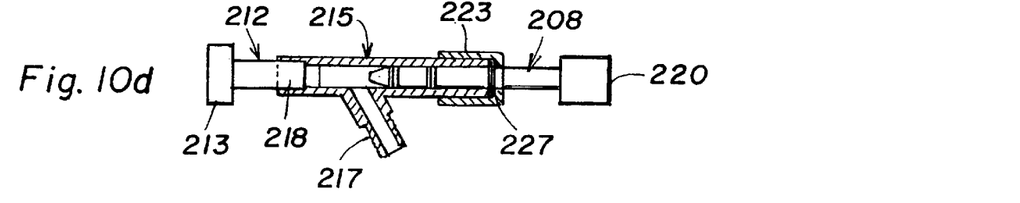

FIG. 10d shows the positions of the pintle 208, the valve body 215, the cylindrical housing 223 and the spring 227 after the trigger 203 has been rotated as far as possible in the direction of the arrow A. As is observable from a comparison of FIGS. 10c and 10d, the valve body 215 has shifted while the pintle 208, the housing 223 and the spring 227 remain in their original positions. However, even though the pintle 208 remained stationary, the pintle 208 is now in its extended position due to the movement of the valve body 215 relative to the pintle 208. When the trigger 203 is allowed to return to its inoperative position, the plunger 212 extends and the valve body 215 moves back to the position of FIG. 10c.

With the metering valve including the pintle 208 in the locked condition as in FIGS. 10c and 10d, the nozzle 201 operates as a metering device. Fluid flows into the nozzle 201 whenever the trigger 203 is squeezed, and the rate of fluid flow increases with increasing displacement of the trigger 203 from its inoperative position. It is preferred for the metering valve to be a proportional valve so that the rate of fluid flow increases in direct proportion to displacement of the trigger 203. In the locked condition of the metering valve, the nipple 217 should be connected to a pressurized fluid source like the pressure bleeder 26 of FIGS. 2 and 6.

The metering valves including the valve elements 8,108 and the pintle 208 allow the flow of fluid to be regulated in a relatively simple manner. The ease with which fluid flow can be regulated is enhanced by the pressure bleeder 26 which supplies pressurized fluid under approximately constant conditions. Furthermore, the pressure bleeder 26 reduces the manual effort required for the delivery of fluid as compared to a hand pump or syringe.

Various modifications are possible within the meaning and range of equivalence of the appended claims.

I claim:
1. A kit for delivering fluid to a hydraulic system comprising:
   a first conduit;
   a second conduit; pressure-driven device for delivering hydraulic fluid connected to one of said conduits and
   a portable fluid conveying device for introducing said fluid into the hydraulic system, said device being connectible to said conduits and including means for metering fluid.
2. The kit of claim 1, further comprising an additional conduit connectible with said device.
3. The kit of claim 1, further comprising a first coupling element for said first conduit and a second coupling element for said second conduit.
4. The kit of claim 3, wherein said first coupling element is complementary to said second coupling element.
5. The kit of claim 1, further comprising an adapter for said device to allow said device to charge fluid through openings of different size.
6. The kit of claim 5, wherein said adapter has a frusto-conical end portion.
7. The kit of claim 6, wherein said adapter further has an annular portion fast with said end portion.
8. The kit of claim 1, wherein said metering means comprises a metering valve.
9. The kit of claim 1, wherein said metering means comprises an element displaceable between two positions, said metering means being designed such that, when said metering means is exposed to pressurized fluid and said element is displaced from one of said positions towards the other of said positions, the amount of fluid discharged from said device is substantially proportional to displacement of said element.
10. The kit of claim 1, wherein said device is provided with an operating member for controlling the discharge of fluid from said device, said operating member being movable between a first position and a second position, and said metering means having an operative condition in which said metering means responds to movement of said operating member such that, when said metering means is exposed to pressurized fluid, the amount of fluid discharged from said device increases to a substantially constant predetermined value as said operating member moves from said first position to said second position, said metering means further having an inoperative condition in which said metering means is unresponsive to movement of said operating member and a preset quantity of fluid is discharged from said device as said operating member moves from said first position to said second position.
11. An arrangement for delivering fluid to hydraulic systems comprising:
   a fluid conveying device for introducing fluid into hydraulic systems; and
   a pressure bleeder containing hydraulic fluid;
   wherein said device is provided with means for metering fluid.
12. The arrangement of claim 11, wherein said metering means comprises a metering valve.
13. The arrangement of claim 11, wherein said metering means comprises an element displaceable between two positions, said metering means being designed such that, when said metering means is exposed to pressurized fluid and said element is displaced from one of said positions towards the other of said positions, the amount of fluid discharged from said device is substantially proportional to displacement of said element.

14. The arrangement of claim 11, wherein said device is provided with an operating member for controlling the discharge of fluid from said device, said operating member being movable between a first position and a second position, and said metering means having an operative condition in which said metering means responds to movement of said operating member such that, when said metering means is exposed to pressurized fluid, the amount of fluid discharged from said device increases to a substantially constant predetermined value as said operating member moves from said first position to said second position, said metering means further having an inoperative condition in which said metering means is unresponsive to movement of said operating member and a preset quantity of fluid is discharged from said device as said operating member moves from said first position to said second position.

15. The arrangement of claim 11, further comprising an adapter to allow said device to charge fluid through openings of different size.

16. The arrangement of claim 15, wherein said adapter has a frustoconical end portion.

17. The arrangement of claim 16, wherein said adapter further has an annular portion fast with said end portion.

18. The arrangement of claim 15, wherein said device has an inlet and an outlet; and further comprising at least one hydraulic system having a master member with an opening, said adapter extending into said opening and said outlet being connected to said adapter, said inlet being connected to said pressure bleeder.

19. The arrangement of claim 11, wherein said device has an inlet and an outlet; and further comprising at least one hydraulic system having a servo member, said outlet being connected to said servo member and said inlet being connected to said pressure bleeder.

20. A method of delivering fluid to a hydraulic system comprising the steps of feeding hydraulic fluid from a pressure bleeder to said system, and of metering said hydraulic fluid.

21. The method of claim 20, wherein said hydraulic system has a servo member and said hydraulic fluid is fed into said hydraulic system through said servo member.

22. The method of claim 20, wherein said hydraulic system has a master member with at least one opening and said hydraulic fluid is fed into said hydraulic system through said one opening.

23. The method of claim 22, further comprising the steps of providing an adapter designed to fit into openings of different size, and inserting said adapter in said one opening prior to the feeding step so that said hydraulic fluid is fed into said hydraulic system via said adapter.

24. The method of claim 23, wherein said adapter has a frustoconical end portion and said end portion is inserted in said one opening.

25. The method of claim 20, wherein the metering step comprises regulating the amount of said hydraulic fluid which is fed into said hydraulic system in substantial proportion to displacement of a valve element.

* * * * *